United States Patent Office 3,641,149
Patented Feb. 8, 1972

3,641,149
POLY(AMINOMETHYL)CYCLOPENTANES
William H. Edgerton, Strafford-Wayne, Pa., assignor to Smith Kline & French Laboratories, Philadelphia, Pa.
No Drawing. Filed Apr. 15, 1969, Ser. No. 816,393
Int. Cl. C07c 87/32
U.S. Cl. 260—563 R          6 Claims

ABSTRACT OF THE DISCLOSURE

Poly(aminomethyl)cyclopentanes and mixed poly(aminomethyl)poly(hydroxymethyl)cyclopentanes are prepared by reducing the corresponding polyamido and polyamidopolyester derivatives of ciscyclopentanetetracarboxylic acid. The compounds are useful as organic intermediates and in the polymer art.

This invention relates to new poly(aminomethyl)cyclopentane derivatives. These new compounds, in the all cis isomeric form, are illustrated by the general formula:

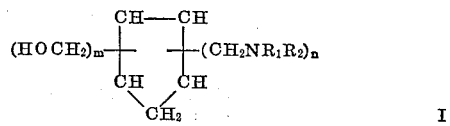

in which $R_1$ and $R_2$ represent hydrogen, alkyl of 1-18 carbon atoms, cycloalkyl of from 5-6 carbon atoms, or benzyl; $n$ is from 1-4; and $m$ is from 0-3, the sum of $m$ and $n$ being 4.

A particularly useful compound is all cis-tetraaminomethylcyclopentane and its acid addition salts.

It can be appreciated that these new compounds are polyfunctional aminomethyl or mixed aminomethyl hydroxymethylcyclopentane derivatives. As such they have utility as general chemical intermediates but more specifically they may be used in the primary or secondary state as polybasic amine units for preparing polyurethanes by the methods described in "Condensation Polymers" by P. W. Morgan, Interscience, pp. 261–304. The whole class of new compounds may also be used as curing agents for epoxy resins, antioxidants, plasticizing agents and lubricating agents.

The compounds of this invention may also exist and be useful in the form of an acid addition salt with an organic or inorganic acid such as maleic, acetic, propionic, benzoic, succinic acid; hydrochloric, sulfuric, formic phosphoric, nitric, sulfamic acid. The salts are formed by traditional chemical methods but most usefully by dissolving the amine in a suitable solvent such as ether, then contacting the base with an excess of the acid such as hydrogen chloride, sulfuric acid, etc. The salt separates from solution. The most useful salt form is that with all the amine functions neutralized and in salt form.

The bases of Formula I are most readily prepared by reducing with an excess of lithium aluminum hydride or with a similar reducing agent a compound of the formula:

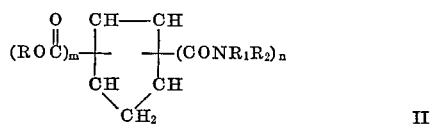

in which $R_1$, $R_2$, $n$ and $m$ are as described above; R is most conveniently methyl or ethyl because of chemical characteristics of the ester form but can also be hydrogen or an alkali metal salt or ammonium salt.

The chemical reaction is usually carried out by dissolving one mole equivalent of the polyamide (II) in a suitable solvent such as ether, tetrahydrofuran or dioxane. An excess of the reducing agent lithium aluminum hydride in ether is added slowly followed by a period of reaction at from room temperature to the boiling point of the reaction mixture. The minimum quantity in moles of lithium aluminum hydride reducing agent to be used may be calculated from the number of ester or amide groups present in the starting material as follows: —$CONH_2$ (1); —$CONHR_1$ (0.75); —$CONR_1R_2$ (0.5); —$CO_2R$ (0.5); —$CO_2H$ (1).

The reaction mixture is quenched and worked up by standard reaction methods, see Organic Reactions VI, pp. 469–509. Other means of reduction are detailed in "Reactions of Organic Compounds" by W. J. Hickenbottom, London (1959) pp. 347–348.

The intermediate polyamides (II) which are part of this invention are prepared by a number of methods. For example, the known polymethyl or ethyl ester of 1,2,3,4-cyclopentanetetracarboxylic acid is reacted with an excess of or a calculated amount of the amine reagent, $HNR_1R_2$, in a suitable solvent. The reaction can be in an autoclave, in a solvent such as methanol or water, in an excess of the amine or even in a high boiling solvent from which the low boiling alcohol formed by condensation can be distilled.

The triamides are produced by reacting a known triester or a diester anhydride of cyclopentanetetracarboxylic acid with an amine as suggested.

The diamides are produced by reacting a known diester, diester monoanhydride or dianhydride of cyclopentanetetracarboxylic acid with an amine as suggested.

The monoamides are prepared by reacting a known monoester or monoester anhydride of cyclopentanetetracarboxylic acid with an amine as suggested.

The alkali metal and amine salts and the lower alkyl esters of these intermediates are prepared by methods well known to the art and apparent from the examples. Sources of starting materials and preparative methods may be had in U.S. 3,346,598; U.S. 3,194,816; U.S. 3,388,187; copending Ser. No. 510,974 now Pat. No. 3,455,990; and copending Ser. No. 563,083 now Pat. No. 3,501,494 (as well as the published British counterparts of the two latter applications).

The following examples illustrate how the compounds of this invention may be prepared.

EXAMPLE 1

The tetramethyl ester of all cis-cyclopentanetetracarboxylic acid (36 g., Chem. Ber. 87, 1752–9, 1954) is dissolved in methanol saturated with ammonia. The mixture is maintained at room temperature for 14 days and filtered to give the tetraamide (II, $m=0$, $n=4$, $R_1$ and $R_2=H$).

This amide (23.6 g.) in a Soxhlet is reacted with lithium aluminum hydride (12 g.) using tetrahydrofuran as solvent. After reaction over several days, the pot mixture is quenched in aqueous hydrochloric acid. The mixture is neutralized and extracted by ether to give tetra(aminomethyl)cyclopentane.

An ether solution of 1 g. of the amine is saturated with hydrogen chloride to give the tetrahydrochloride salt. Substituting other volatile amines such as methyl or ethylamine or diemthyl amine in the above reaction using ether in the reduction step gives tetra(methylaminomethyl), tetra(ethylaminomethyl) and tetra(dimethylaminomethyl) cyclopentane.

EXAMPLE 2

Tetramethyl ester of cyclopentanetetracarboxylic acid (7.55 g.) is heated at reflux with cyclohexylamine (50 ml.) for 5 hours. The excess amine is taken off in vacuo to give the tetracyclohexylamide.

The amide (5.6 g.) is reacted with lithium aluminum hydride (1.2 g.) in ether at reflux. The mixture is quenched and worked up as described above to give tetra(cyclohexylaminomethyl)cyclopentane.

EXAMPLE 3

The tetramethylester (7.5 g.) is heated at reflux in an excess of benzylamine for 3 hours to give the tetrabenzylamide. This amide (7 g.) is reacted with lithium aluminum hydride (1 g.) in dioxane-ether mixture to give tetra(benzylaminomethyl)cyclopentane.

EXAMPLE 4

The tetramethylester (7.55 g.) is heated at reflux for 5 hours with n-butylamine (5.99 g.) The solid formed is boiled with methanol, filtered and the filtrate cooled to give tri-(n-butylamide)monomethyl ester of cis-cyclopentanetetracarboxylic acid. This compound (4.3 g.) is reacted with 1.2 g. of lithium aluminum hydride in ether at reflux, then worked up by quenching and ether extraction to give tri-(n-butylaminomethyl)mono(hydroxymethyl)cyclopentane as the sulfate salt.

EXAMPLE 5

Cyclopentanetetracarboxylic acid dianhydride (52.5 g.) is dissolved in acetone (2 l.), cooled and ammonia gas bubbled through the solution. The solid which separates is diamide diammonium salt of the tetracarboxylic acid.

This material is neutralized with dilute hydrochloric acid, then heated at reflux in methanol to give the di(methyl ester)-diamide which (2.3 g.) is reacted with 1 g. of lithium aluminum hydride in ether at reflux in a Soxhlet apparatus to give di(aminomethyl)-di(hydroxymethyl)cyclopentane. This material is dissolved in ethylacetate and reacted with acetic acid to give the acetate salt.

EXAMPLE 6

Cyclopentanetetracarboxylic acid dianhydride (21 g.), cyclopentylamine (23.1 ml.) and toluene (100 ml.) are stirred then distilled over a Dean & Stark trap for 1 hour. The solid is removed and washed with hot acetone to give dicyclopentylamide of all cis-cyclopentanetetracarboxylic acid.

This material is heated with acidified methanol to give the diester which (2.1 g.) is heated in ether with lithium aluminum hydride (1 g.) to give di(cyclopentylaminomethyl)di(hydroxymethyl)cyclopentane.

EXAMPLE 7

Cyclopentanetetracarboxylic acid monoanhydride (0.57 g.) with cyclohexylamine (2 ml.) and toluene (5 ml.) is heated on the steam bath for 30 minutes. The cooled mixture is triturated with ether (10 ml.) and filtered to give the mono(cyclohexylamide)tricyclohexylamine salt of the tetra acid. The salt is neutralized, esterified and reduced as described in Example 5 to give cyclohexylaminomethyltri(hydroxymethyl)cyclopentane.

EXAMPLE 8

Substituting stearylamine for cyclopentylamine in Example 6 with sufficient toluene to maintain solution gives the distearylamide intermediate then the useful end compound di(stearylaminomethyl)di(hydroxymethyl)cyclopentane a potential suspending agent.

Using the methods described specifically above such variations in starting materials, other compounds of this invention can be readily prepared.

What is claimed is:

1. Compounds of the formula:

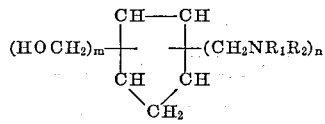

in which $R_1$ and $R_2$ are hydrogen or alkyl of 1–18 carbon atoms; $n$ is an integer from 1–4; and $m$ is an integer from 0–3, the sum of $m$ and $n$ being 4.

2. The compound of claim 1 in which $R_1$ and $R_2$ are hydrogen, $m$ is 0 and $n$ is 4.

3. The compound of claim 1 in which $R_1$ is hydrogen, $R_2$ is n-butyl, $m$ is 1 and $n$ is 3.

4. The compound of claim 1 in which $R_1$ and $R_2$ are hydrogen, $m$ is 2 and $n$ is 2.

5. The compound of claim 1 in which $R_1$ is hydrogen, $R_2$ is stearyl, $m$ is 2 and $n$ is 2.

6. The compound of claim 1 in which $R_1$ is hydrogen, $R_2$ is n-butyl, $m$ is 1 and $n$ is 3.

References Cited

FOREIGN PATENTS 1,078,467   of 1967   Great Britain _____ 260—563

CHARLES B. PARKER, Primary Examiner

D. R. PHILLIPS, Assistant Examiner

U.S. Cl. X.R.

252—51.5, 401; 260—32.6 R, 468 R, 471 R, 472 R, 501.1, 501.2, 514 R, 518 R, 557 R, 570.9